United States Patent
Haug et al.

(10) Patent No.: US 10,202,955 B2
(45) Date of Patent: Feb. 12, 2019

(54) HOLDER FOR FASTENING A FUEL DISTRIBUTOR TO AN INTERNAL COMBUSTION ENGINE, AND CONNECTING METHOD

(71) Applicant: Robert Bosch GmbH, Stuttgart (DE)

(72) Inventors: Martin Haug, Weil der Stadt (DE); Klaus Lang, Stuttgart (DE); Thomas Froihofer, Brackenheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 85 days.

(21) Appl. No.: 14/916,883

(22) PCT Filed: Jul. 9, 2014

(86) PCT No.: PCT/EP2014/064700
§ 371 (c)(1),
(2) Date: Jun. 14, 2016

(87) PCT Pub. No.: WO2015/032530
PCT Pub. Date: Mar. 12, 2015

(65) Prior Publication Data
US 2016/0305387 A1    Oct. 20, 2016

(30) Foreign Application Priority Data

Sep. 6, 2013  (DE) .......................... 10 2013 217 810

(51) Int. Cl.
*F02M 63/02*    (2006.01)
*F02M 55/02*    (2006.01)
(Continued)

(52) U.S. Cl.
CPC ........ *F02M 63/0275* (2013.01); *F02M 55/02* (2013.01); *F02M 55/025* (2013.01);
(Continued)

(58) Field of Classification Search
CPC ............ F02M 55/025; F02M 63/0275; F02M 69/462; F02M 55/02; F02M 61/14
(Continued)

(56) References Cited

U.S. PATENT DOCUMENTS 5,056,489 A * 10/1991 Lorraine .............. F02M 69/465
                                                      123/456
6,340,019 B1 * 1/2002 Eshleman ............ F02M 69/465
                                                      123/469
(Continued)

FOREIGN PATENT DOCUMENTS

CN    103210204 A    7/2013
DE    102008044165    6/2010
(Continued)

OTHER PUBLICATIONS

International Search Report for PCT/EP2014/064700, dated Sep. 18, 2014.

*Primary Examiner* — Eret C McNichols
(74) *Attorney, Agent, or Firm* — Norton Rose Fulbright US LLP; Gerard Messina

(57) ABSTRACT

A holder serves for fastening a component, in particular a fuel distributor, onto an internal combustion engine. A holding element that has a component-side connecting segment is provided. The holding element is connectable at the component-side connecting segment to the component. The holding element furthermore has a fastening-means-side connecting segment at which the holding element is fastenable via a fastening means onto the internal combustion engine. A receiving part and a fastening sleeve are provided. The receiving part serves to connect the fastening sleeve to the fastening-means-side connecting segment of the holding element. The fastening sleeve has a through opening through which the fastening means is guidable. An assemblage (Continued)

having such a holder is also described. A connecting method is furthermore described.

11 Claims, 10 Drawing Sheets

(51) Int. Cl.
  *F02M 61/14* (2006.01)
  *F02M 69/46* (2006.01)
  *F16M 13/02* (2006.01)
  *F16B 5/02* (2006.01)

(52) U.S. Cl.
  CPC .......... *F02M 61/14* (2013.01); *F02M 69/462* (2013.01); *F16M 13/02* (2013.01); *F02M 2200/03* (2013.01); *F02M 2200/09* (2013.01); *F02M 2200/26* (2013.01); *F02M 2200/306* (2013.01); *F02M 2200/8084* (2013.01); *F02M 2200/855* (2013.01); *F02M 2200/857* (2013.01); *F16B 5/0225* (2013.01)

(58) Field of Classification Search
  USPC .................................................. 123/456, 469
  See application file for complete search history.

(56) References Cited

U.S. PATENT DOCUMENTS

| | | | | |
|---|---|---|---|---|
| 6,817,337 | B1 * | 11/2004 | Siring | F02M 35/10144 |
| | | | | 123/195 A |
| 7,516,735 | B1 * | 4/2009 | Doherty | F02M 55/005 |
| | | | | 123/468 |
| 7,591,246 | B2 * | 9/2009 | Beardmore | F02M 55/025 |
| | | | | 123/456 |
| 7,682,117 | B2 * | 3/2010 | Holt | F02M 55/025 |
| | | | | 403/408.1 |
| 7,793,639 | B2 * | 9/2010 | Hunt | F02M 55/025 |
| | | | | 123/470 |
| 8,307,809 | B2 * | 11/2012 | Hay | F02M 55/025 |
| | | | | 123/198 E |
| 8,800,534 | B2 * | 8/2014 | Kannan | F02M 61/168 |
| | | | | 123/468 |
| 8,875,681 | B2 * | 11/2014 | Kannan | F02M 61/168 |
| | | | | 123/456 |
| 9,429,121 | B2 * | 8/2016 | Fischer | F02M 55/025 |
| 9,810,189 | B2 * | 11/2017 | Maier | F02M 69/50 |
| 2010/0126470 | A1 | 5/2010 | Yudanov et al. | |
| 2011/0073074 | A1 | 3/2011 | Hay et al. | |
| 2013/0068198 | A1 * | 3/2013 | Maier | F02M 69/50 |
| | | | | 123/456 |
| 2013/0104852 | A1 * | 5/2013 | Kannan | F02M 61/168 |
| | | | | 123/456 |
| 2013/0125864 | A1 * | 5/2013 | Kannan | F02M 61/168 |
| | | | | 123/469 |
| 2013/0284152 | A1 * | 10/2013 | Fischer | F02M 55/025 |
| | | | | 123/470 |
| 2014/0026401 | A1 * | 1/2014 | Solferino | B23P 19/00 |
| | | | | 29/700 |
| 2014/0102415 | A1 * | 4/2014 | Wyban | F02D 19/0647 |
| | | | | 123/456 |
| 2015/0075495 | A1 * | 3/2015 | Fischer | F02M 55/025 |
| | | | | 123/456 |

FOREIGN PATENT DOCUMENTS

| | | |
|---|---|---|
| DE | 202011005464 | 7/2011 |
| EP | 1047872 A1 | 11/2000 |
| EP | 2372140 | 10/2011 |
| JP | 2008157029 A | 7/2008 |
| JP | 2012082775 A | 4/2012 |

* cited by examiner

HOLDER FOR FASTENING A FUEL DISTRIBUTOR TO AN INTERNAL COMBUSTION ENGINE, AND CONNECTING METHOD

FIELD OF THE INVENTION

The present invention relates to a holder for fastening a component, in particular a fuel distributor, onto an internal combustion engine; to an assemblage having a component and such a holder; and to a connecting method for connecting a component that has a tubular base member to at least one holder. The invention relates in particular to the field of fuel injection systems of internal combustion engines.

BACKGROUND INFORMATION

German Published Patent Application No. 10 2008 044 165 discloses a fuel apportioner for an internal combustion engine having a housing. Attached to the fuel apportioner are several injection valves that inject fuel under high pressure into combustion chambers associated directly with them. A screw mount serves to fasten the fuel apportioner. An assembly screw is introduced into a bore of the screw mount. The shank of the assembly screw encompasses a respective annular-disk-shaped damping element on both sides of the screw mount. On the side facing away from the screw head the assembly screw has a screw retainer made of plastic, and a spacing sleeve. When the damping element is introduced between the fuel apportioner and the added-on structure and additionally in the region of the assembly screws, complete insulation with no metallic contacts is then achieved between the fuel apportioner and the added-on structure, which results in maximum reduction in solid-borne sound transfer through the assembly screws into the added-on structure.

The fuel apportioner known from German Published Patent Application No. 10 2008 044 165, and the fastening system, related thereto, of the fuel apportioner, have the disadvantage that the positioning accuracy of the bore of the screw mount, and thus also the positioning accuracy of the fastening system, is low. The result is that tolerances for assembly must be allowed for, but these in turn lead to a positioning inaccuracy with regard to the fuel apportioner. In addition, several screw mounts are necessary in practice. Mechanical stresses then occur in the context of fastening due to the positioning inaccuracies via the fuel apportioner. This limits possible use of the known fuel apportioner with this fastening system.

DISCLOSURE OF THE INVENTION

The holder according to the present invention, the assemblage according to the present invention, and the connecting method according to the present invention have the advantage that an improved configuration is made possible. In particular, large individual part tolerances can initially be enabled, but stringent demands in terms of predefined subassembly tolerances can then still be achieved. The result is an improved utilization range with low manufacturing costs.

The fastening means with which the holding element is fastenable onto the internal combustion engine is not necessarily a constituent of the holder according to the present invention. A fastening screw, for example, can serve as a fastening means. Fastening of the holding element onto the internal combustion engine can be accomplished directly onto the internal combustion engine, in particular onto a cylinder head of the internal combustion engine. The holding element can also, however, be fastened onto the internal combustion engine by way of a suitable added-on structure. The holding element is thus connected via the fastening means at least indirectly to the internal combustion engine when assembly of the component, in particular of the fuel distributor, onto the internal combustion engine has been accomplished.

The component is preferably embodied as a fuel distributor. A fuel distributor of this kind can optionally also serve as a reservoir for a certain quantity of fuel, and can distribute the 2o fuel to individual fuel injection valves. The fuel injection valves can be connected in a suitable manner to the fuel distributor. In particular, cups into which the filler fittings of the internal combustion engine are inserted can be provided on the fuel distributor. Fastening of the fuel injection valves onto the internal combustion engine can likewise be accomplished via the fuel distributor, which is fastened at least via a holder onto the internal combustion engine. The fuel injection valves can also, however, be fastened separately onto the internal combustion engine.

Advantageously, an abutment surface that is configured as part of a cylinder enveloping surface is configured on the component-side connecting segment. As a result of this, the holding element can be abutted at its component-side connecting segment, for example, against a tubular base member of the component in order to enable assembly. The holding element can then be moved relative to the tubular base member and thereby positioned. Such motions can be accomplished by way of rotary motions and/or linear displacements along an axis of the tubular base member. Contact between the abutment surface and an outer side of the tubular base member is maintained here, the contact occurring in planar fashion. When the correct position is reached, connection of the holding element, at its component-side connecting segment, to the tubular base member can then be accomplished.

It is advantageous that an aperture in which the fastening sleeve is placeable is provided on the fastening-means-side connecting segment; and that a positioning clearance, which, prior to connection of the fastening sleeve via the receiving part to the fastening-means-side connecting segment, allows positioning of the fastening sleeve in an axial direction of the fastening sleeve and/or in at least one radial direction of the fastening sleeve relative to the fastening-means-side connecting segment, is provided between the fastening sleeve and the aperture. This also allows the individual parts to be manufactured with larger tolerances. High accuracy can nevertheless be achieved thanks to a correspondingly accurate definition of the end positions of the individual parts. It is thereby possible, for example, to utilize for the manufacture of the individual parts manufacturing methods that as a rule are less accurate but are inexpensive. For example, stamped bent parts can be used. In particular, the holder can be configured as a stamped bent part. Cost-intensive post-processing of the individual parts can then be reduced and, if applicable, even entirely omitted.

It is also advantageous in this context that the aperture that is provided on the fastening-means-side connecting segment is configured as a through bore. The fastening sleeve can then be positioned in the through bore relative to the fastening-means-side connecting segment. The through bore is laterally closed. It is also possible, however, for the aperture that is provided on the fastening-means-side connecting segment to be open toward one side of the fastening-means-side connecting segment. The result thereof is that the fastening sleeve can be introduced into the fasteningmeans-side connecting segment from the open side. This makes possible, inter alia, configurations of the fastening sleeve that are not suitable for introduction into a correspondingly tight through bore.

Advantageously, the receiving part is configured as a partly annular receiving part that partly surrounds the fastening sleeve circumferentially. It is also possible, however, for the receiving part to be configured as an annular receiving part that surrounds the fastening sleeve circumferentially. When the individual parts are positioned with respect to one another, the connection between the fastening sleeve and the fastening-means-side connecting segment of the holding element is then established via the receiving part. The connection of the receiving part to the fastening sleeve and the connection of the receiving part to the fastening-means-side connecting segment can be accomplished, for example, by welding, soldering, or adhesive bonding.

It is also advantageous that a further receiving part is provided; that the further receiving part serves to connect the fastening sleeve to the fastening-means-side connecting segment of the holding element; and that the fastening-means-side connecting segment is disposed, for connection of the fastening sleeve to the fastening-means-side connecting segment, between the receiving part and the further receiving part. The receiving part and the further receiving part can in this context be configured identically. The receiving part and the further receiving part can, however, also be configured differently. For example, the receiving parts can be configured in disk-shaped fashion and can have different disk thicknesses and/or different outside disk diameters and/or different inside disk diameters. A greater load-carrying capacity for the connection between the fastening sleeve and the fastening-means-side connecting segment is then achievable by way of the two receiving parts.

It is advantageous that the receiving part has, on an outer side, an at least partly peripheral cutout. It is advantageous in particular that the receiving part has on the outer side an at least partly peripheral groove, if the fastening-means-side connecting segment is open toward the side. It is further advantageous here that, for connection of the fastening sleeve to the 2o fastening-means-side connecting segment, the fastening-means-side connecting segment engages at its aperture into the cutout of the receiving part. A connection to the fastening-means-side connecting segment and to the fastening sleeve can then be accomplished by way of the receiving part both on an upper side and on a lower side of the fastening-means-side connecting segment. Assembly is at the same time thereby simplified, since the number of components is reduced.

It is also advantageous that the fastening sleeve has a fastening segment on which the receiving part is disposed for connection of the fastening sleeve to the fastening-means-side connecting segment; and that the fastening sleeve is configured on the fastening-means-side connecting segment constrictedly relative to at least one end segment of the fastening sleeve. The result is that, for tight installation spaces, the fastening sleeve can be constricted at least in a center segment between the end segments with no change in the attachment diameters of the fastening sleeve. The geometry, in particular the outside diameter in the center segment, can thereby be made smaller while attachment diameters of the fastening sleeve remain the same. If the center segment of the fastening sleeve is configured constrictedly relative to both end segments, the fastening-means-side connecting segment is then configured to be open toward one side in order to enable introduction of the fastening sleeve.

In the context of the configuration of the base member of the component, it is advantageous that at least one fastening region of an outer side of the base member is configured as part of a cylinder enveloping surface, the holder relevant thereto being fastened at its component-side connecting segment to the fastening region on the outer side of the base member. This makes possible during assembly, i.e. prior to final fastening, a planar abutment of the component-side connecting segment against the fastening region while positioning is being carried out.

DETAILED DESCRIPTION

Figure 1:
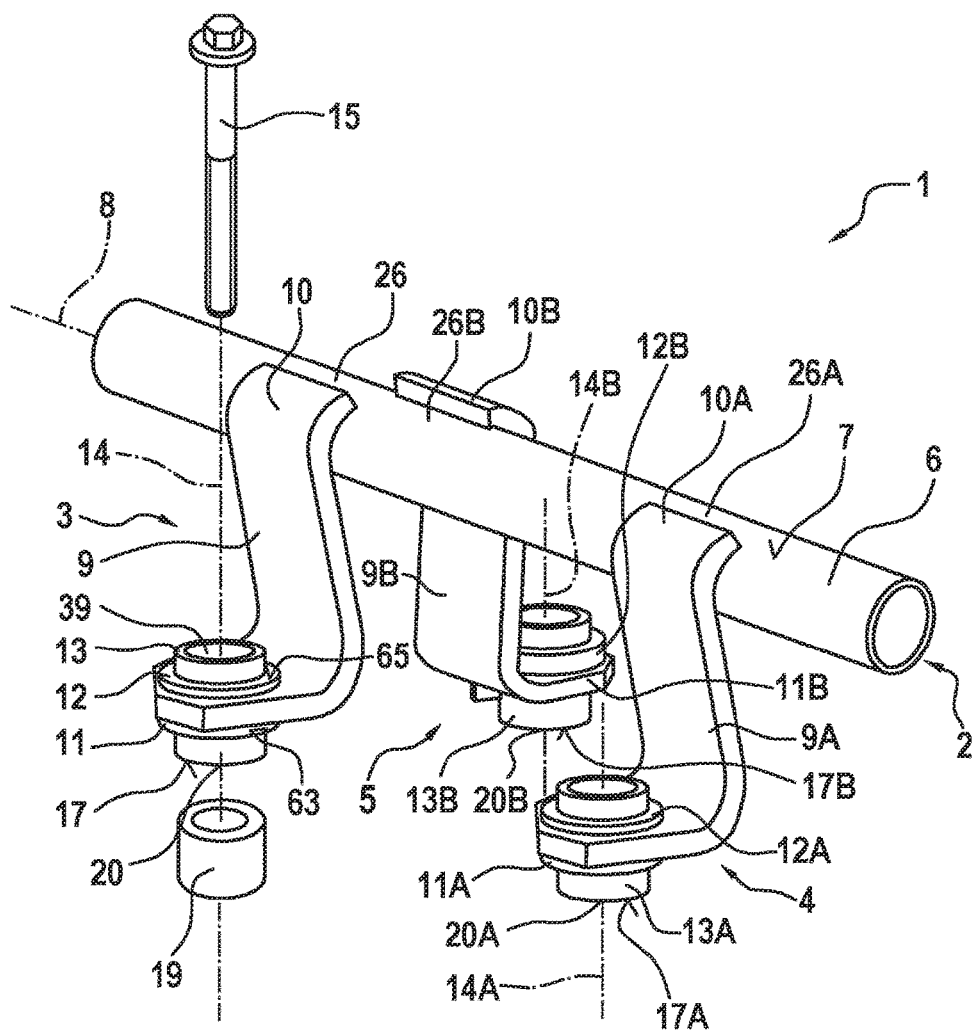
FIG. 1 is a schematic three-dimensional depiction of portions of an assemblage, having a component and several holders, corresponding to a first exemplifying embodiment of the invention.

FIG. 1 is a schematic three-dimensional depiction of portions of an assemblage 1, having a component 2 and several holders 3, 4, 5, corresponding to a first exemplifying embodiment. Component 2 has a tubular base member 6 having an outer side 7 in the shape of a cylinder enveloping surface. Component 2 furthermore has a longitudinal axis 8 along which the tubular base member 6 extends. Component 2 can be configured, for example, as a fuel distributor. Suitable outputs, in particular cups, can be installed on the tubular base member 6 in order to distribute the delivered fuel to several fuel injection valves. In order to simplify the depiction, these outputs or cups are not shown.

Holder 3 has a holding element 9 having a component-side connecting segment 10 and a fastening-means-side connecting segment 11. Holder 3 furthermore has a receiving part 12 and a fastening sleeve 13. An axis serving as fastening axis 14 is defined by fastening sleeve 13. A fastening means 15, which is associated with holder 3 and configured as fastening bolt 15, is guided along axis 14 through fastening sleeve 13 in order to fasten fastening-means-side connecting segment 11 of holding element 9 onto an internal combustion engine 16 (FIG. 2), in particular onto a cylinder head of internal combustion engine 16. A spacing sleeve 19 can be disposed between a lower side 17 of fastening sleeve 13 and an upper surface 18 of internal combustion engine 16. Spacing sleeve 19 can be constituted from an elastic material in order to enable decoupling.

Axis 14 and lower side 17 of fastening sleeve 13, or a surface in which lower side 17 of fastening sleeve 13 is located, have an intersection point 20. Intersection point 20 also results here as intersection point 20 between axis 14 and an alignment surface 21 (FIG. 2).

Holders 4, 5 correspondingly have holding elements 9A, 9B having component-side connecting segments 10A, 10B and fastening-means-side connecting segments 11A, 11B.

Holders 4, 5 furthermore have receiving parts 12A, 12B that serve to fasten fastening sleeves 13A, 13B onto fastening-means-side connecting segments 11A, 11B. Axes (fastening axes) 14A, 14B are defined by fastening sleeves 13A, 13B. Fastening onto several points on cylinder head 16 is possible by way of the fastening means (not depicted) corresponding to fastening means 15, optionally using the spacing sleeves (not depicted) corresponding to spacing sleeve 19. Lower sides 17A, 17B of fastening sleeves 13A, 13B of holders 4, 5 are preferably located in alignment surface 21 in which lower side 17 of fastening sleeve 13 is also located. Intersection points 20A, 20B result in this context between axis 14A or axis 14B and alignment surface 21. Holders 4, 5 are thus configured correspondingly to holder 3. Holders 3 to 5 can be configured identically to one another.

Figure 2:
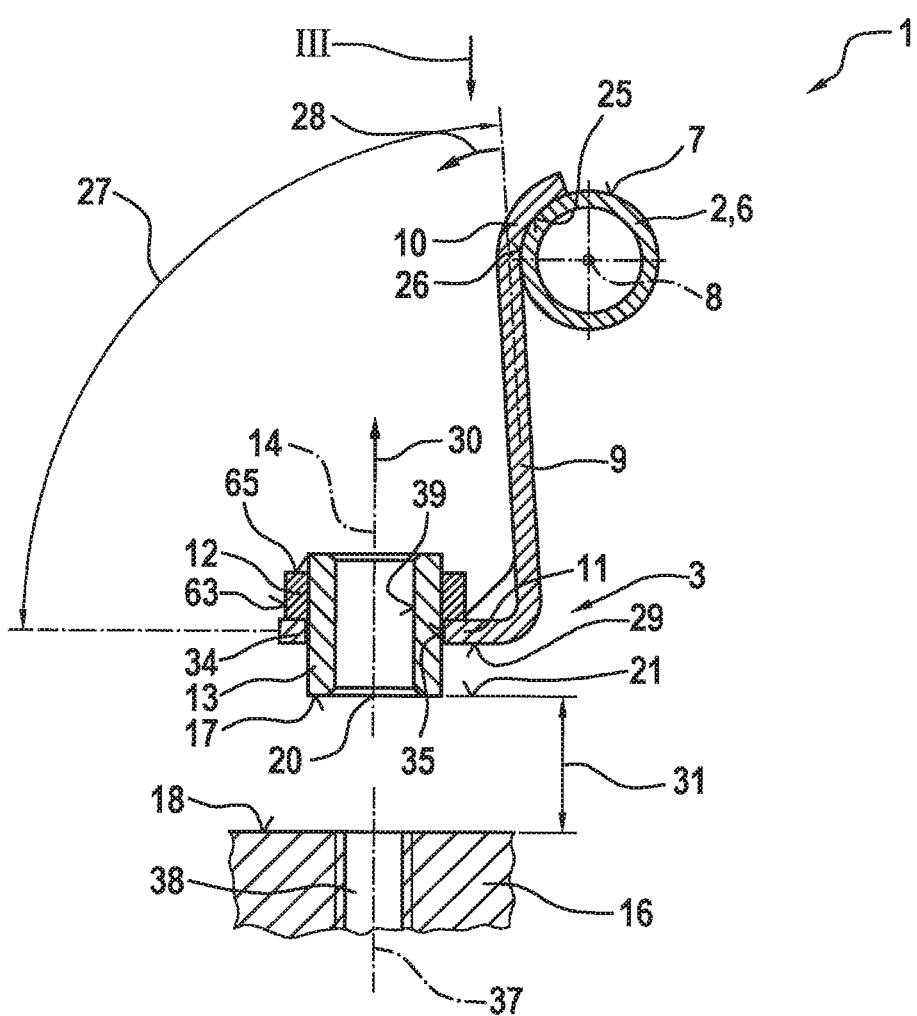
FIG. 2 is a schematic sectioned depiction of portions of the assemblage depicted in FIG. 1 corresponding to the first exemplifying embodiment of the invention, and of an internal combustion engine.

FIG. 2 is a schematic sectioned depiction of portions of assemblage 1 depicted in FIG. 1 corresponding to the first exemplifying embodiment of the invention, and of internal combustion engine 16. What is depicted by way of example is a section through holding element 9, axis 14 of fastening sleeve 13 being located in the section plane. Longitudinal axis 8 of the tubular base member 6 is furthermore oriented perpendicularly to the section plane.

An abutment surface 25 is configured on component-side connecting segment 10. A fastening region 26, against which holding element 9 abuts with its abutment surface 25, is also provided on outer side 7 of the tubular base member 6. Fastening regions 26A, 26B are correspondingly also provided for holders 4, 5 on the tubular base member 6. Abutment 2*o* surface 25 is configured as part of a cylinder enveloping surface. Fastening region 26 is furthermore configured as part of a cylinder enveloping surface. In this exemplifying embodiment outer surface 7 is configured globally in the shape of a cylinder enveloping surface, thereby producing in any case the fastening regions 26A, 26B in the shape of a cylinder enveloping surface.

In order to connect holder 9 to component 2, component-side connecting segment 10 of holding element 9 is abutted against fastening region 26 of outer side 7 of the tubular base member 6. It is possible in this context for an angle 27 of holding element 9 to vary as a result of production tolerances, thus affecting the orientation of lower side 17 with respect to alignment surface 21. Lower side 17 of fastening sleeve 13, or a lower side 29 of fastening-means-side connecting segment 11, can be oriented parallel to alignment surface 21 by rotating holding element 9 in or oppositely to a rotation direction 28. The planar contact between abutment surface 25 and fastening region 26 upon alignment is retained in this context.

Fastening sleeve 13 can furthermore be adjusted in or oppositely to a direction 30. A distance 31 between lower side 17 and surface 18 of cylinder head 16 can thereby be adjusted for later assembly in order to achieve, in the assembled state, the distance defined by the design between longitudinal axis 8 of the tubular base member 6 and surface 18.

A rotational compensation is thus enabled by way of a rotation in or oppositely to rotation direction 28. A vertical compensation is moreover enabled by way of a displacement of fastening sleeve 13 in or oppositely to direction 30. Axis 14 of fastening sleeve 13 can thus be aligned perpendicularly to surface 18 of cylinder head 16. Distance 31 between lower side 17 of fastening sleeve 13 and surface 18 of cylinder head 16 can furthermore be adjusted.

Fastening sleeve 13 has a through opening 39 that is configured in this exemplifying embodiment as through bore 39. Upon positioning of fastening sleeve 13 relative to fastening-means-side connecting segment 11, fastening sleeve 13 is displaced relative to fastening-means-side connecting segment 11 in or oppositely to direction 30, i.e. axially with respect to axis 14 of through opening 39, until the predefined distance 31 is attained. This can be achieved in different ways; the individual positioning operations can influence one another, and the motion of fastening sleeve 13 relative to fastening-means-side connecting segment 11 can also be effected by rotating holding element 9 in or oppositely to rotation 2*o* direction 28 if the position of fastening sleeve 13 has already been preliminarily defined, as also described e.g. with reference to FIGS. 4 and 5.

Figure 3:
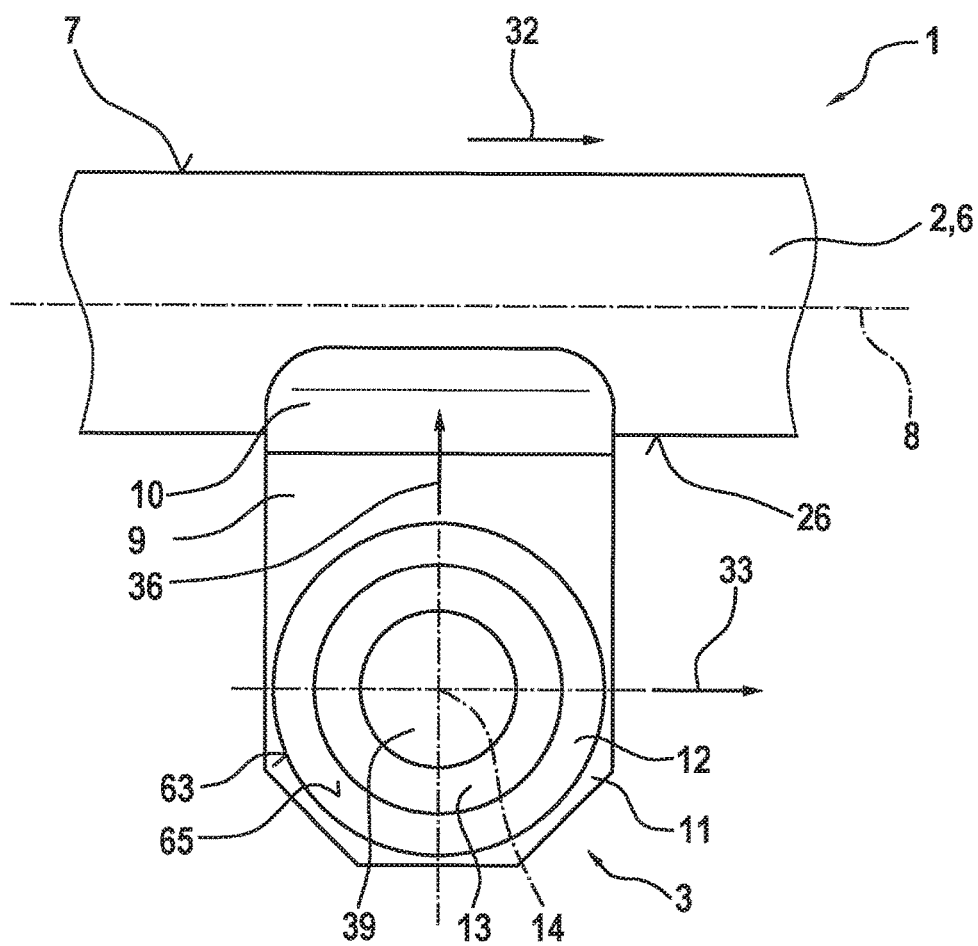
FIG. 3 schematically depicts portions of the assemblage shown in FIG. 2 from the viewing direction labeled III.

FIG. 3 schematically depicts portions of assemblage 1 shown in FIG. 2 from the viewing direction labeled III. Component-side connecting segment 10 of holding element 9 can be displaced, prior to connection, in and oppositely to a direction 32 along longitudinal axis 8 of the tubular base member 6. For this, fastening region 26 is expanded in suitable fashion along longitudinal axis 8. In this exemplifying embodiment the entire outer side 7 is in any case configured in the shape of a cylinder enveloping surface, with the result that a sufficiently large extent of fastening region 26 is also always achieved.

Fastening sleeve 13 can furthermore be moved, in and oppositely to a direction 33, relative to 3*o* fastening-means-side connecting segment 11, this being enabled by an annular gap 34 (FIG. 2). Annular gap 34 is embodied here between fastening sleeve 13 and fastening-means-side connecting segment 11. Provided for this purpose on the fastening-means-side connecting segment is an aperture 35 in which fastening sleeve 13 is placeable with a circumferential positioning clearance 34 that is provided by annular gap 34.

Fastening sleeve 13 can furthermore, because of positioning clearance 34, also be moved in and oppositely to a direction 36 relative to fastening-means-side connecting segment 11. In terms of axis 14 that represents fastening axis 14, fastening sleeve 13 can thus be positioned in radial directions 33, 36 relative to fastening-means-side connecting segment 11. The result is that, for example proceeding from a position in which lower side 17 of fastening sleeve 13 is parallel to surface 18 of internal combustion engine 16 or to alignment surface 21, axis 14 can be brought into a position in which it coincides, for fastening onto internal combustion engine 16, with an axis 37 of a threaded bore 38 of cylinder head 16.

In this exemplifying embodiment, radial direction 33 is oriented parallel to longitudinal axis 8 of the tubular base member 6. Radial direction 36 is oriented parallel to lower side 29 of fastening-means-side connecting segment 11 and perpendicular to radial direction 33. A radial tolerance compensation is thus enabled by the displaceability of fastening sleeve 13 relative to fastening-means-side connecting segment 11 in radial directions 33, 36. In addition, a tolerance compensation along longitudinal axis (tube axis) 8 is enabled by the displaceability of the entire holder element 9 in direction 32.

Figure 4:
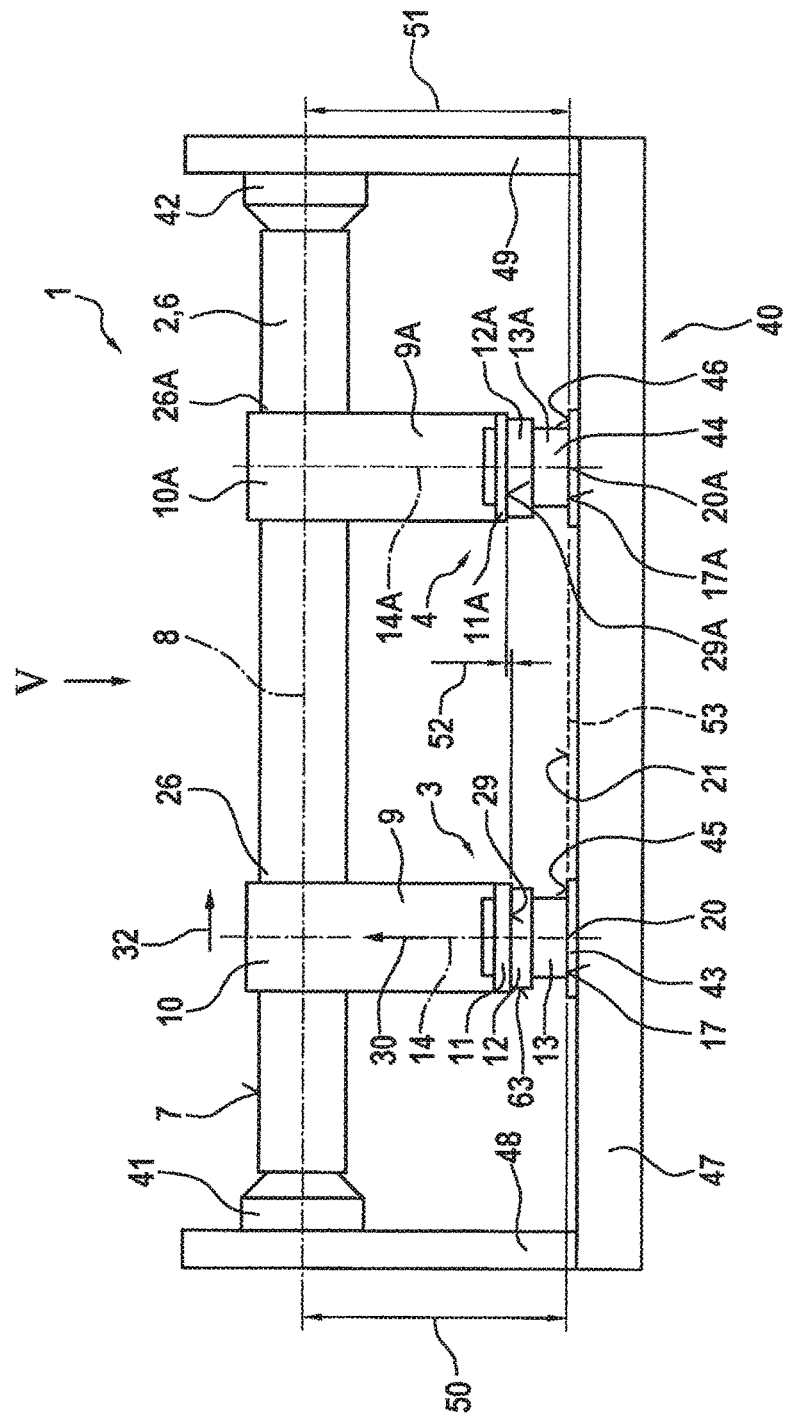
FIG. 4 schematically depicts an apparatus for assembling an assemblage having a component and several holders, corresponding to a second exemplifying embodiment, in order to explain the manner of operation of the invention.

FIG. 4 schematically depicts an apparatus 40 for assembling assemblage 1, which is made up of a tubular base member 6, a component 2, and holders 3, 4, corresponding to a second exemplifying embodiment, in order to explain the manner of operation of the invention. In this context, firstly a positioning of the individual parts of assemblage 1 is performed. Then the individual parts, positioned with respect to one another, are connected to one another.

The tubular base member 6 is clamped between receiving tapers 41, 42 of apparatus 40, longitudinal axis 8 of the tubular base member 6 being oriented parallel to alignment surface 21. Apparatus 40 furthermore has slip-on arbors 43, 44; upper sides 45, 46 of foot regions of slip-on arbors 43, 44 are located at the same height, and define the location of alignment surface 21. Fastening sleeves 13, 13A are slipped onto slip-on arbors 43, 44 so that lower side 17 of fastening sleeve 13 and a lower side 17A of fastening sleeve 13A rest in planar fashion on upper sides 45, 46 of slip-on arbors 43, 44 and slip centeredly onto slip-on arbors 43, 44. Lower sides 17, 17A of fastening sleeves 13, 13A are thus located in alignment surface 21. These components, namely the tubular base member 6 and fastening sleeves 13, 13A, for which high positioning accuracy is required, are thus positioned with respect to one another via apparatus 40.

Receiving parts 12, 12A are then slid over fastening sleeves 13, 13A. The radial alignment of receiving parts 12, 12A with respect to the subassembly is thus determined. The axial position of receiving parts 12, 12A is not yet defined.

Holding elements 9, 9A are now positioned on the tubular base member 6. Holding element 9 is rotated around longitudinal axis 8, in or oppositely to rotation direction 28, until lower side 29 of fastening-means-side connecting segment 11 is parallel to alignment surface 21 or parallel to upper side 45 of slip-on arbor 43. Lower side 29 of holding element 9 is thus also parallel to the end surface of receiving part 12. It is thus possible, depending on the tolerance zone of the individual parts, to adjust annular gap 34 or positioning clearance 34 to have a different size, i.e. not uniformly along the circumference.

Receiving part 12 is then slid onto fastening sleeve 13 until receiving part 12 is in contact with fastening-means-side connecting segment 11.

The operation described is also carried out correspondingly for the other holders 9A and optionally for further holders, such as holder 9B. The individual parts of assemblage 1 are then positioned with respect to one another. The individual parts are then immobilized with 2o respect to one another in that position. Immobilization can be accomplished, for example, by welding and/or soldering and/or adhesive bonding.

In this exemplifying embodiment apparatus 40 has a base plate 47 and side plates 48, 49. Slip-on arbors 43, 44 are fastened onto base plate 47. Receiving tapers 41, 42 are fastened onto the respective side plate 48, 49. During positioning, a height dimension 50 of longitudinal axis (tube axis) 8 with respect to lower side 17 of fastening sleeve 13 is defined. A height dimension 51 of tube axis 8 with respect to lower side 17A of fastening sleeve 13A is also defined. In this exemplifying embodiment, definition is accomplished by way of the distance between tube axis 8 and alignment surface 21, which is equal to the (in this case, identical) height dimensions 50, 51. In a variant configuration, however, height dimensions 50, 51 can also be different.

Because holding elements 9, 9A can be manufactured with certain tolerances, the holders 3, 4 being positioned and immobilized can differ somewhat from one another. For example, a height difference 52 can exist between lower side 29 of fastening-means-side connecting segment 11 and a lower side 29A of fastening-means-side connecting segment 11A.

Figure 5:
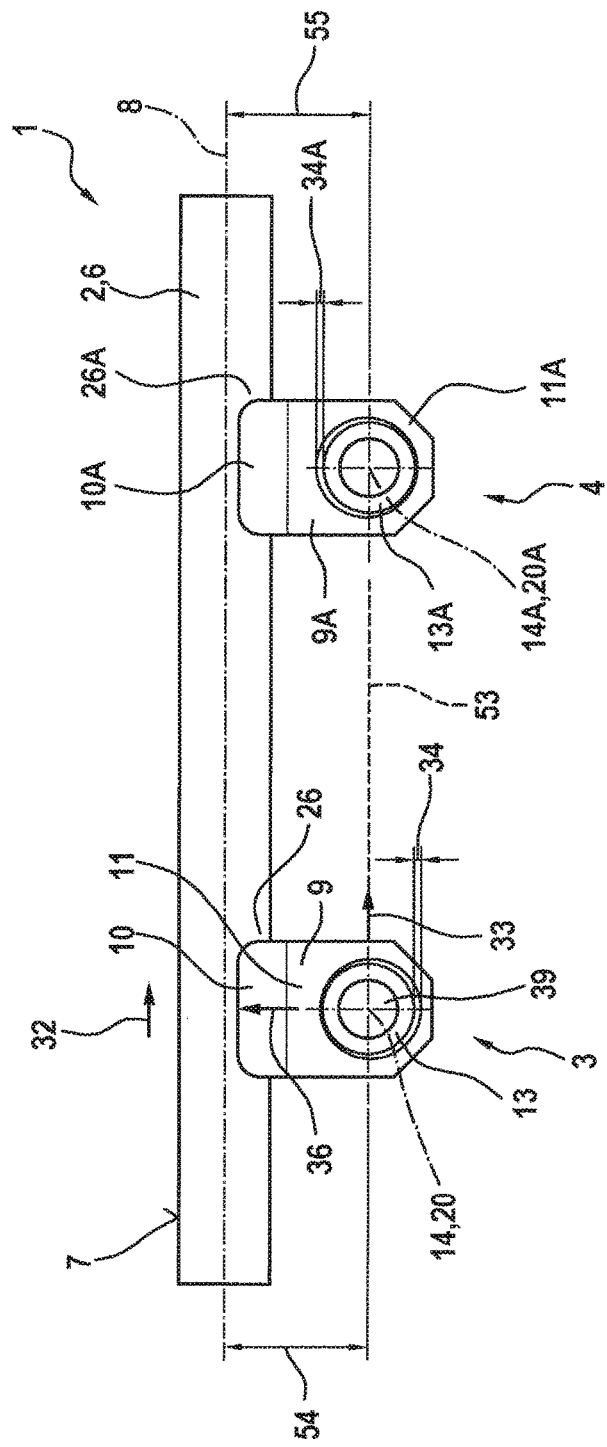
FIG. 5 schematically depicts the assemblage corresponding to the second exemplifying embodiment of the invention, depicted in FIG. 4, from the viewing direction labeled V.

FIG. 5 schematically depicts assemblage 1 corresponding to the second exemplifying embodiment of the invention, depicted in FIG. 4, from the viewing direction labeled V. Before the individual components of assemblage 1 are connected to one another, fastening sleeves 13, 13A are also adjusted in radial directions 33, 36. The rotation furthermore occurs in or oppositely to rotation direction 28, as explained correspondingly with reference to FIG. 2. This can result in different positionings of holding elements 9, 9A, which produce different positions of fastening sleeves 13, 13A relative to the respective fastening-means-side connecting segment 11, 11A. For example, holding element 9A can be rotated farther than holding element 9 in rotation direction 28, as illustrated in FIG. 5. When intersection points 20, 20A are located, for example, on the common auxiliary line 53 that is oriented parallel to longitudinal axis 8 and is located in alignment surface 21, as illustrated with reference to FIGS. 4 and 5, this can result, because of the different rotation directions 28, in a displacement in radial direction 36 for fastening sleeve 13, while a radial displacement oppositely to radial direction 36 results for fastening sleeve 13A. The consequence is to produce different configurations with regard to the respective positioning clearance 34, 34A or the respective annular gap 34, 34A for holders 3, 4, as illustrated in FIG. 5.

After positioning and connection of the components, the desired distance 54, viewed in a projection onto alignment surface 21, is established between longitudinal axis 8 and intersection point 20A of fastening sleeve 13. Also established is a desired distance 55, viewed in a projection onto alignment surface 21, between tube axis 8 and intersection point 20A of fastening sleeve 13A. In this exemplifying embodiment the two intersection points 20, 20A are located on auxiliary line 53 that is parallel to tube axis 8, so that distances 54, 55 are the same. In a variant configuration, however, distances 54, 55 of different magnitudes can be defined for the individual holders 3, 4.

In assemblage 1 according to the first exemplifying embodiment, which is described with reference to FIGS. 1 to 3, receiving part 12 is disposed on a side of fastening-means-side connecting segment 11 facing away from lower side 29. In assemblage 1 according to the second exemplifying embodiment, which is described with reference to FIGS. 4 and 5, receiving part 12 is disposed on lower side 29 of fastening-means-side connecting segment 11. In both exemplifying embodiments, receiving part 12 circumferentially surrounds fastening sleeve 13. Aperture 35 is moreover configured respectively as a through bore 35 in the first exemplifying embodiment and the second exemplifying embodiment. Annular receiving part 12 that circumferentially surrounds fastening sleeve 13 can be slid from the respective side onto fastening sleeve 13 in the context of assembly.

Figure 6:
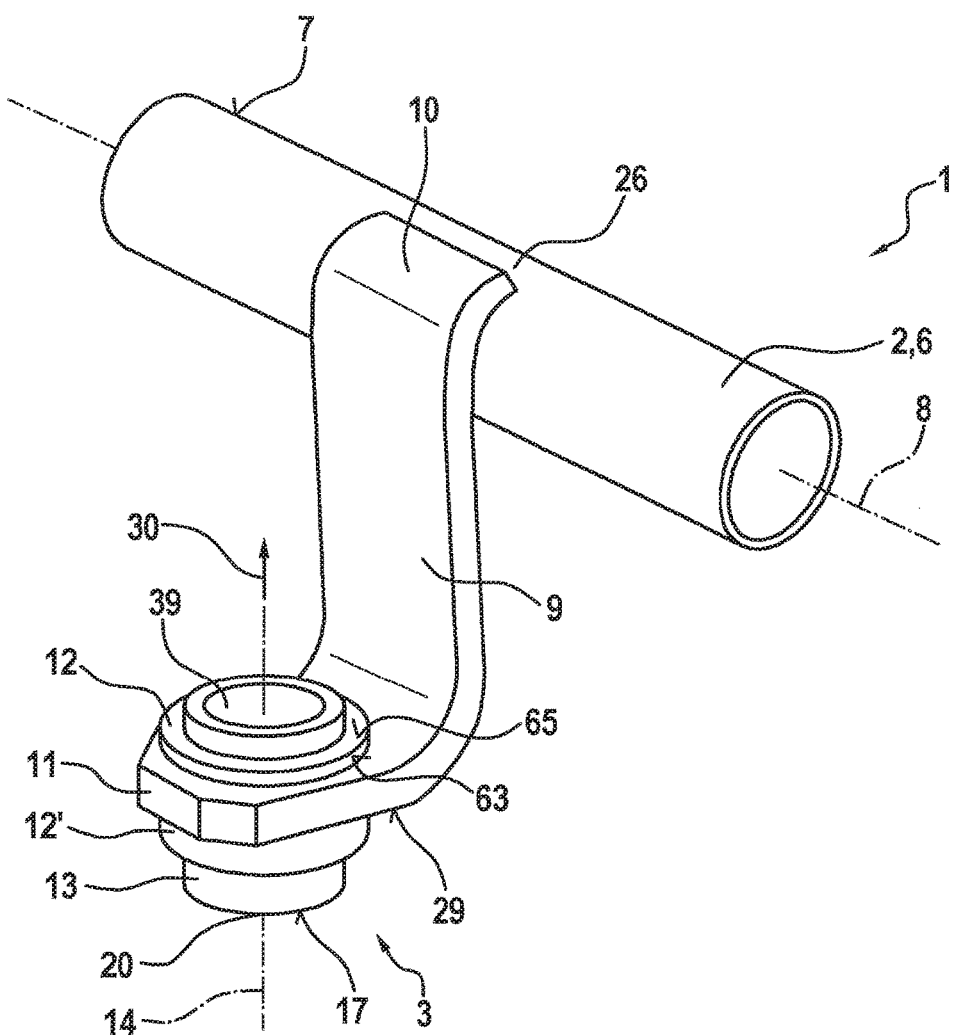
FIG. 6 is a schematic three-dimensional depiction of portions of the assemblage depicted in FIG. 1, corresponding to a third exemplifying embodiment of the invention.

FIG. 6 is a schematic three-dimensional depiction of portions of assemblage 1 depicted in FIG. 1, corresponding to a third exemplifying embodiment. In this exemplifying embodiment as in the first exemplifying embodiment described with reference to FIG. 1, a receiving part 12 that is disposed on the side of fastening-means-side connecting segment 11 facing away from lower side 29 is provided. Also provided is a further receiving part 12' that serves to connect fastening sleeve 13 to fastening-means-side connecting segment 11. Fastening-means-side connecting segment 11 is disposed between receiving part 12 and further receiving part 12'. An improved connection between holding element 9 and fastening sleeve 13, via the two receiving parts 12, 12', is thus implemented.

Aperture 35 through which fastening sleeve 13 extends is configured as through bore 35.

Figure 7:
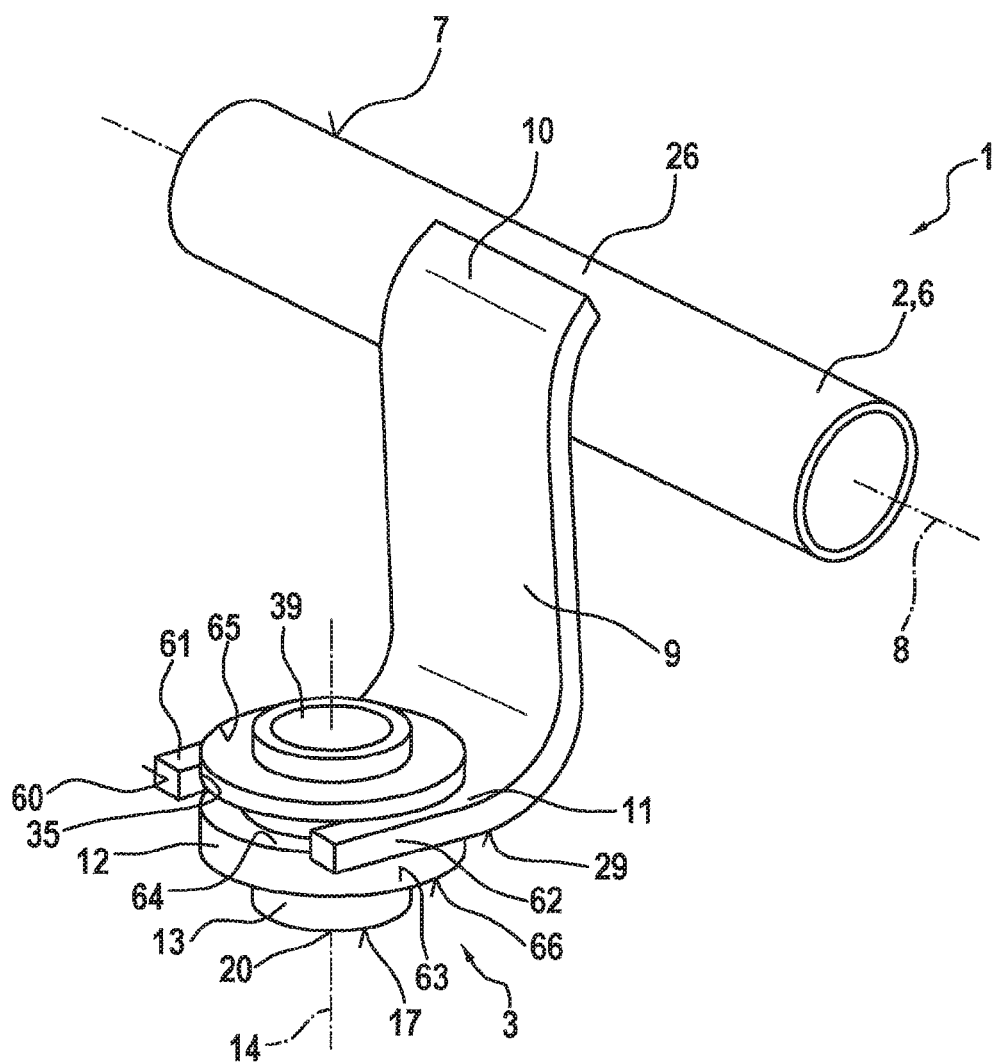
FIG. 7 is a schematic three-dimensional depiction of portions of the assemblage depicted in FIG. 1, corresponding to a fourth exemplifying embodiment of the invention.

FIG. 7 is a schematic three-dimensional depiction of portions of assemblage 1 depicted in FIG. 1, corresponding to a fourth exemplifying embodiment. In this exemplifying embodiment aperture 35 of connecting segment 11 is configured to be open toward one side 60. In this exemplifying embodiment fastening-means-side connecting segment 11 has two arms 61, 62 disposed parallel to one another so that a U-shaped connecting segment 11 results. Receiving part 12 is inserted between arms 61, 62 from open side 60. In the inserted state, receiving part 12 is thus immobilized along fastening axis 14. Fastening sleeve 13 can, however, firstly still be positioned along fastening axis 14, relative to receiving part 12 or to fastening-means-side connecting segment 11, for positioning. In the positioned state, connection of receiving part 12 on the one hand to fastening-means-side connecting segment 11, in particular to arms 61, 62, and on the other hand to fastening sleeve 13, then occurs.

Figure 8:
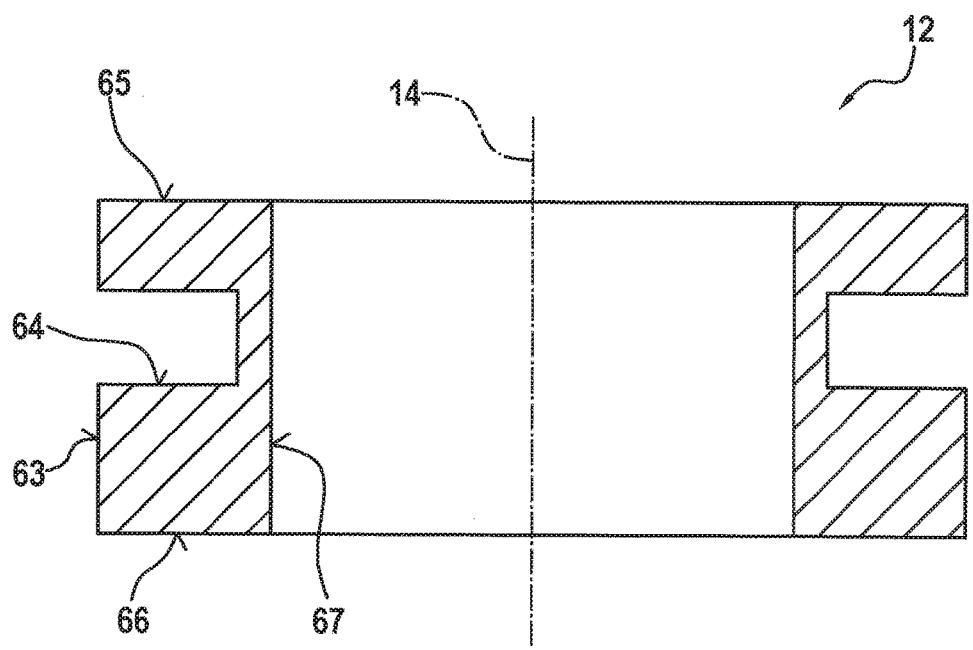
FIG. 8 is a schematic axial sectioned depiction of a receiving part of the assemblage depicted in FIG. 7, corresponding to the fourth exemplifying embodiment of the invention.

FIG. 8 is a schematic axial sectioned depiction of a receiving part of assemblage 1 depicted in FIG. 7, corresponding to the fourth exemplifying embodiment. Receiving part 12 has an outer side 63. A peripheral cutout is provided on outer side 63 in receiving part 12. In this exemplifying embodiment cutout 64 is configured as a peripheral groove 64. Cutout 64 is thereby spaced away from end faces 65, 66. For introduction of receiving part 12 into aperture 35 of fastening-means-side connecting segment 11, the latter must therefore have open side 60.

In a variant embodiment, cutout 64 can also extend as far as one of end faces 65, 66. Aperture 35 of fastening-means-side connecting segment 11 can then also be configured as a through bore 35.

The advantage of receiving part 12 that extends at least locally through aperture 35 of fastening-means-side connecting segment 11 along axis 14 is that an attachment surface 67 with respect to fastening sleeve 13 is elongated along fastening axis 14 and thus enlarged overall. With the groove-shaped configuration of cutout 64, however, a thickness of fastening-means-side connecting segment 11 along axis 14 must be adapted to the corresponding dimension of cutout 64. In the assembled state, fastening-means-side connecting segment 11 then engages with its arms 61, 62 into cutout 64 of receiving part 12.

Figure 9:
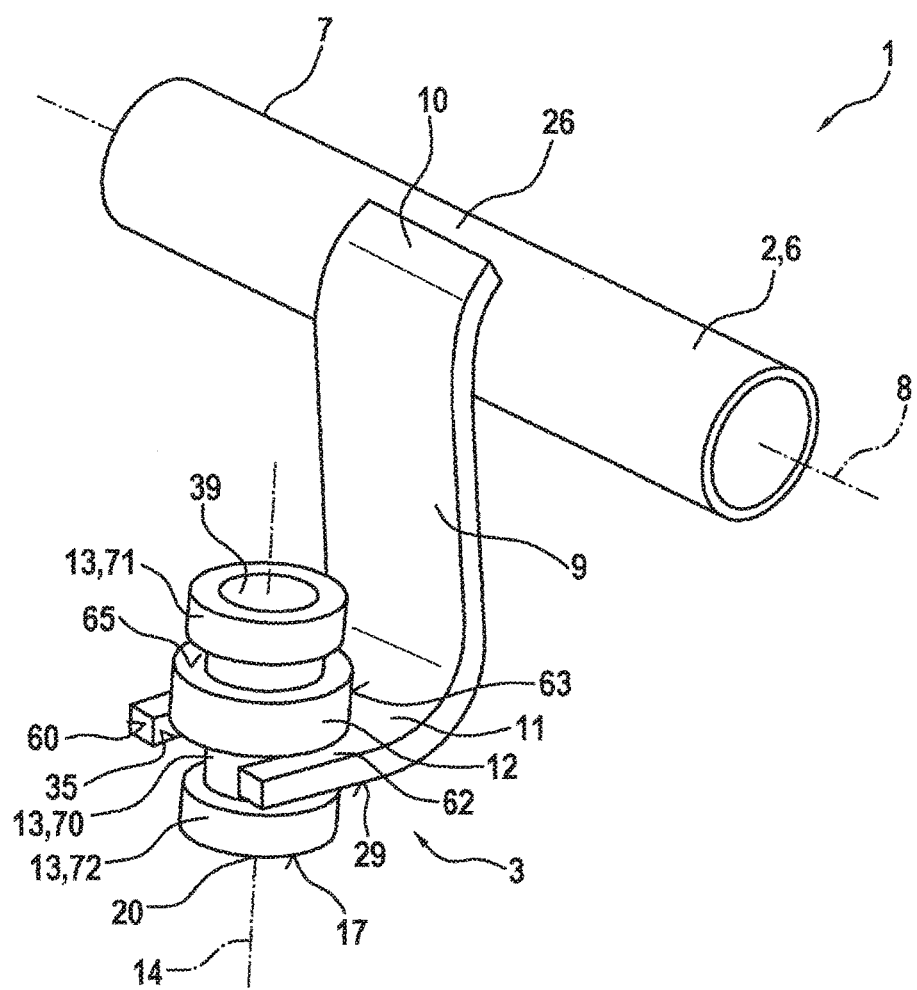
FIG. 9 is a schematic three-dimensional depiction of portions of the assemblage depicted in FIG. 1, corresponding to a fifth exemplifying embodiment of the invention.

FIG. 9 is a schematic three-dimensional depiction of portions of assemblage 1 depicted in FIG. 1, corresponding to a fifth exemplifying embodiment. In this exemplifying embodiment fastening sleeve 13 has a fastening segment 70 and end segments 71, 72. Fastening segment 70 is provided between end segments 71, 72. Fastening segment 70 of fastening sleeve 13 is configured constrictedly relative to end segments 71, 72. Receiving part 12 is disposed on fastening segment 70 in order to connect fastening sleeve 13 to fastening-means-side 2o connecting segment 11. In order to dispose receiving part 12 on fastening segment 70, fastening sleeve 13 can be configured, for example, in multiple parts. In a variant configuration, receiving part 12 can also be configured only partly annularly, as described correspondingly with reference to FIG. 10.

The advantage of configuring fastening sleeve 13 with the constricted fastening segment 70 is that the geometry, in particular a diameter of aperture 35, can thereby also be made smaller. As a result, the external geometry of holding element 9 also becomes smaller. If two end segments 71, 72 are provided, an open side 60 is then preferably provided on fastening-means-side connecting segment 11.

Figure 10:
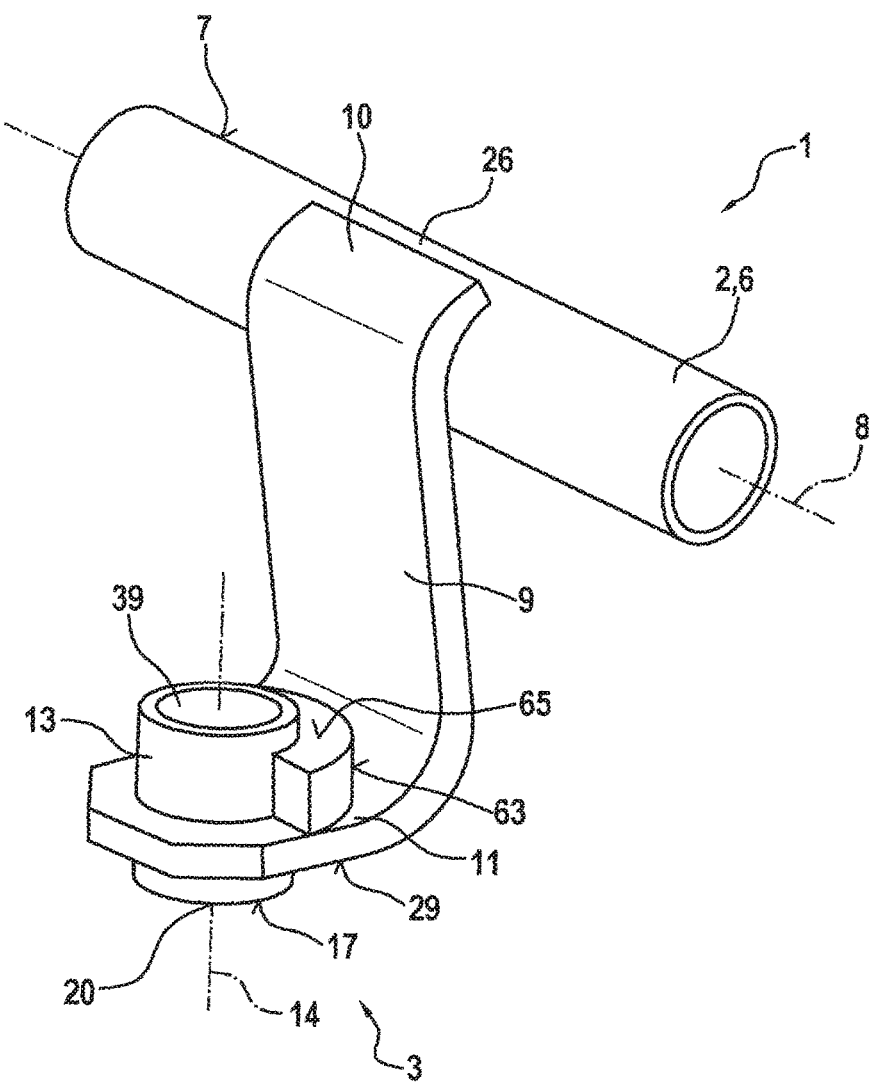
FIG. 10 is a schematic three-dimensional depiction of portions of the assemblage depicted in FIG. 1, corresponding to a sixth exemplifying embodiment of the invention.

FIG. 10 is a schematic three-dimensional depiction of portions of assemblage 1 depicted in FIG. 1, corresponding to a sixth exemplifying embodiment. In this exemplifying embodiment receiving part 12 is circumferentially open. Specifically, in this exemplifying embodiment receiving part 12 is configured as a semi-annular receiving part 12. Receiving part 12, thereby configured in partly annular fashion, surrounds fastening sleeve 13 only in part. The space requirement can optionally also be decreased as a result. Placement of receiving part 12 in the respective application instance is also thereby optionally facilitated. With the specific configuration of fastening sleeve 13 as illustrated with reference to FIG. 9, receiving part 12 can then be disposed advantageously.

A variety of modifications are possible depending on the configuration. Specifically, identical or different receiving parts 12, 12' can be utilized depending on the application instance. Specifically, different disk thicknesses and diameters of receiving parts 12, 12' of one holder 3, and/or different receiving parts 12, 12A, 12B on several holders 3 to 5, can be used.

Advantageously, fastening sleeve 13 is displaced along fastening axis 14 in the context of positioning, so that lower side 17 of fastening sleeve 13 is at the defined distance 31 from the surface (abutment surface) of the attachment geometry, in particular of internal combustion engine 16.

Receiving part 12 can be displaced radially in radial directions 33, 36 together with fastening sleeve 13, so that fastening axis 14 of receiving part 12 or of fastening sleeve 13 can be aligned coaxially with axis 37 of threaded bore 38 or the like.

Holding element 9 can furthermore be pivoted or rotated around longitudinal axis (tube axis) 8 so that lower side 29, or the side facing away from lower side 29, at which receiving part 12 is immobilized in the respective application instance, can be positioned parallel to surface 18 of attachment geometry 16.

If necessary, holding element 9 can be axially displaced along longitudinal axis 8, which is possible in or oppositely to direction 32, in order to enable an additional tolerance compensation of fastening axis 14.

The accuracy with which the individual components in the subassembly are positioned for assemblage 1 is achieved via the adjusting operation of the connecting method during joining. At least one receiving part 12, 12', 12A, 12B is used for the adjusting operation for each holder 3 to 5.

The joining process is accomplished by positioning the individual parts with respect to one another and immobilizing the individual parts in a stress-free state with the aid of at least one receiving part 12, 12', 12A, 12B.

Receiving parts 12, 12', 12A, 12B can be embodied in the form of a closed ring. Receiving parts 12, 12', 12A, 12B can also be configured in a different shape, however, for example as a half-shell, cuboid, or sickle.

The invention is not limited to the exemplifying embodiments described.

What is claimed is:

1. A holder for fastening a component onto an internal combustion engine, comprising:
a holding element including:
a component-side connecting segment at which the holding element is connectable to the component, and
a fastening-means-side connecting segment at which the holding element is fastenable via a fastening means onto the internal combustion engine;
at least one receiving part; and
a fastening sleeve, wherein:
the receiving part serves to connect the fastening sleeve to the fastening-means-side connecting segment of the holding element,
the fastening sleeve has a through opening through which the fastening means is guidable,
an aperture in which the fastening sleeve is placeable is provided on the fastening-means-side connecting segment, and
a positioning clearance that enables positioning of the fastening sleeve in an axial direction of the fastening sleeve and at least one radial direction of the fastening sleeve relative to the fastening-means-side connecting segment, before connection of the fastening sleeve via the receiving part to the fastening-means-side connecting segment, is provided between the fastening sleeve and the aperture;
wherein the receiving part is connected to the fastening sleeve by: welding, soldering, or adhesive bonding.

2. The holder as recited in claim 1, wherein the component is a fuel distributor.

3. The holder as recited in claim 1, further comprising an abutment surface that is configured at least approximately as part of a cylinder enveloping surface is configured on the component-side connecting segment.

4. The holder as recited in claim 1, wherein the aperture is configured as a through bore.

5. The holder as recited in claim 1, wherein the receiving part is configured as at least one of an annular receiving part and surrounds the fastening sleeve circumferentially.

6. The holder as recited in claim 1, further comprising:
a further receiving part that connects the fastening sleeve to the fastening-means-side connecting segment of the holding element, wherein the fastening-means-side connecting segment is disposed, for connection of the fastening sleeve to the fastening-means-side connecting segment, between the receiving part and the further receiving part.

7. The holder as recited in claim 1, wherein:
the receiving part has on an outer side an at least partly peripheral cutout, and
the fastening-means-side connecting segment engages into the cutout of the receiving part for connection of the fastening sleeve to the fastening-means-side connecting segment.

8. The holder as recited in claim 1, wherein:
the fastening sleeve has a fastening segment at which the receiving part is disposed for connection of the fastening sleeve to the fastening-means-side connecting segment, and
the fastening sleeve is configured constrictedly, relative to at least one end segment of the fastening sleeve, at the fastening-means-side connecting segment.

9. An assemblage, comprising:
a component; and
at least one holder for fastening the component onto an internal combustion engine, the holder including:
a holding element including:
a component-side connecting segment at which the holding element is connectable to the component, and
a fastening-means-side connecting segment at which the holding element is fastenable via a fastening means onto the internal combustion engine,
at least one receiving part, and
a fastening sleeve, wherein:
the receiving part serves to connect the fastening sleeve to the fastening-means-side connecting segment of the holding element,
the fastening sleeve has a through opening through which the fastening means is guidable,
the component includes a base member,
at least one fastening region of an outer side of the base member is configured at least approximately as part of a cylinder enveloping surface,
the at least one holder is fastened at its component-side connecting segment to the fastening region on the outer side of the base member,
an aperture in which the fastening sleeve is placeable is provided on the fastening-means-side connecting segment, and
a positioning clearance that enables positioning of the fastening sleeve in an axial direction of the fastening sleeve and at least one radial direction of the fastening sleeve relative to the fastening-means-side connecting segment, before connection of the fastening sleeve via the receiving part to the fastening-means-side connecting segment, is provided between the fastening sleeve and the aperture;
wherein the receiving part is connected to the fastening sleeve by: welding, soldering, or adhesive bonding.

10. A connecting method for connecting a component that has a tubular base member to at least one holder for fastening a component onto an internal combustion engine, the holder comprising:
a holding element including:
a component-side connecting segment at which the holding element is connectable to the component, and
a fastening-means-side connecting segment at which the holding element is fastenable via a fastening means onto the internal combustion engine;
at least one receiving part; and
a fastening sleeve, wherein:
the receiving part serves to connect the fastening sleeve to the fastening-means-side connecting segment of the holding element,
the fastening sleeve has a through opening through which the fastening means is guidable,
an aperture in which the fastening sleeve is placeable is provided on the fastening-means-side connecting segment, and
a positioning clearance that enables positioning of the fastening sleeve in an axial direction of the fastening sleeve and at least one radial direction of the fastening sleeve relative to the fastening-means-side connecting segment, before connection of the fastening sleeve via the receiving part to the fastening-meansside connecting segment, is provided between the fastening sleeve and the aperture, the method comprising:
- receiving the tubular base member between two receiving tapers;
- positioning the receiving part in at least one radial direction on the fastening sleeve;
- abutting the holding element with its component-side connecting segment against the tubular base member;
- rotating the holding element around a tube axis of the tubular base member in such a way that a lower side of the fastening-means-side connecting segment of the holding element is parallel to an alignment surface;
- displacing the at least one receiving part relative to the fastening sleeve, axially with respect to the through opening of the fastening sleeve, in such a way that the at least one receiving part abuts against the fastening-means-side connecting segment;
- positioning the fastening sleeve in the axial direction and the at least one radial direction relative to the fastening-means-side connecting segment using the positioning clearance;
- connecting the component-side connecting segment intermaterially to the tubular base member;
- connecting the receiving part intermaterially to the fastening-means-side connecting segment; and
- connecting the receiving part being connected intermaterially to the fastening sleeve;
- wherein the receiving part is connected to the fastening sleeve by: welding, soldering, or adhesive bonding.

11. A holder for fastening a component onto an internal combustion engine, comprising:
- a holding element including:
  - a component-side connecting segment at which the holding element is connectable to the component, and
  - a fastening-means-side connecting segment at which the holding element is fastenable via a fastening means onto the internal combustion engine;
- at least one receiving part; and
- a fastening sleeve, wherein:
  - the receiving part serves to connect the fastening sleeve to the fastening-means-side connecting segment of the holding element,
  - the fastening sleeve has a through opening through which the fastening means is guidable,
  - an aperture in which the fastening sleeve is placeable is provided on the fastening-means-side connecting segment, and
  - a positioning clearance that enables positioning of the fastening sleeve in an axial direction of the fastening sleeve and at least one radial direction of the fastening sleeve relative to the fastening-means-side connecting segment, before connection of the fastening sleeve via the receiving part to the fastening-means-side connecting segment, is provided between the fastening sleeve and the aperture;
- wherein the receiving part is connected to the fastening-means-side connecting segment by: welding, soldering, or adhesive bonding.

* * * * *